United States Patent
Funaoka et al.

(10) Patent No.: US 11,697,177 B2
(45) Date of Patent: Jul. 11, 2023

(54) LASER PROCESSING METHOD AND LASER PROCESSING APPARATUS

(71) Applicant: Mitsubishi Electric Corporation, Tokyo (JP)

(72) Inventors: Koji Funaoka, Tokyo (JP); Masayuki Saiki, Tokyo (JP); Takashi Inoue, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 36 days.

(21) Appl. No.: 17/480,144

(22) Filed: Sep. 21, 2021

(65) Prior Publication Data

US 2022/0001493 A1    Jan. 6, 2022

Related U.S. Application Data

(62) Division of application No. 17/289,235, filed as application No. PCT/JP2018/044411 on Dec. 3, 2018, now Pat. No. 11,548,099.

(51) Int. Cl.

| | |
|---|---|
| *B23K 26/382* | (2014.01) |
| *B23K 26/0622* | (2014.01) |
| *B23K 26/14* | (2014.01) |
| *B23K 26/073* | (2006.01) |
| *B23K 26/402* | (2014.01) |
| *B23K 103/16* | (2006.01) |

(52) U.S. Cl.
CPC ........ *B23K 26/382* (2015.10); *B23K 26/0622* (2015.10); *B23K 26/073* (2013.01); *B23K 26/1462* (2015.10); *B23K 26/402* (2013.01); *B23K 2103/172* (2018.08)

(58) Field of Classification Search
CPC .......................... B23K 26/382; B23K 26/0622
See application file for complete search history.

(56) References Cited

U.S. PATENT DOCUMENTS

| | | | |
|---|---|---|---|
| 5,254,834 A | 10/1993 | Johnson | |
| 5,719,372 A | 2/1998 | Togari et al. | |

(Continued)

FOREIGN PATENT DOCUMENTS

| | | |
|---|---|---|
| CN | 102049618 A | 5/2011 |
| DE | 69310438 T2 | 10/1997 |

(Continued)

OTHER PUBLICATIONS

Chinese Office Action issued in a corresponding Chinese patent application 201880099853.1, dated Apr. 13, 2022.

(Continued)

*Primary Examiner* — Timothy Kennedy
(74) *Attorney, Agent, or Firm* — Xsensus LLP

(57) ABSTRACT

A laser processing method for laser processing of a workpiece made of a base material and a fiber reinforced composite material containing fibers having a thermal conductivity and a processing threshold higher than physical properties of glass fibers. The laser processing method includes a step of processing the workpiece by forming a plurality of through-holes extending through the workpiece by irradiating the workpiece with pulsed laser light from a processing head while relatively moving the workpiece and the processing head in a predetermined cutting direction. The pulsed laser light has a pulse width smaller than 1 ms and an energy density capable of forming each of the through-holes by a single pulse.

9 Claims, 13 Drawing Sheets

(56) References Cited

U.S. PATENT DOCUMENTS

| | | | |
|---|---|---|---|
| 5,864,114 | A | 1/1999 | Fukuda |
| 5,911,891 | A | 6/1999 | Dulaney et al. |
| 6,027,786 | A | 2/2000 | Ford |
| 8,258,429 | B2 | 9/2012 | Kobayashi et al. |
| 9,919,383 | B2 | 3/2018 | Kano |
| 10,427,358 | B2 | 10/2019 | Jörn et al. |
| 2002/0111029 | A1 | 8/2002 | Johnson |
| 2002/0185474 | A1 | 12/2002 | Dunsky et al. |
| 2007/0045255 | A1 | 3/2007 | Kleine et al. |
| 2010/0282727 | A1 | 11/2010 | Kobayashi et al. |
| 2011/0188251 | A1 | 8/2011 | Kalms et al. |
| 2017/0232558 | A1 | 8/2017 | Kano |
| 2017/0355151 | A1 | 12/2017 | Jörn et al. |
| 2020/0023590 | A1 | 1/2020 | Jörn et al. |

FOREIGN PATENT DOCUMENTS

| | | |
|---|---|---|
| DE | 112009000138 B4 | 4/2016 |
| DE | 102016210115 A1 | 12/2017 |
| DE | 112014006885 B4 | 3/2018 |
| EP | 2915620 A2 | 9/2015 |
| JP | 5-228682 A | 9/1993 |
| JP | 5-261575 A | 10/1993 |
| JP | 2010-154145 A | 7/2010 |
| JP | 2010-247206 A | 11/2010 |
| JP | 2011-098381 A | 5/2011 |
| JP | 2017-154145 A | 9/2017 |
| JP | 2019-904 A | 1/2019 |

OTHER PUBLICATIONS

Office Action dated Dec. 3, 2021 in Chinese Patent Application No. 201880099853.1, 16 pages.

U.S. Office Action dated Jun. 7, 2022 in U.S. Appl. No. 17/289,235, 17 pages.

International Search Report and Written Opinion dated Jan. 29, 2019, received for PCT Application PCT/JP2018/044411, Filed on Dec. 3, 2018, 10 pages including English Translation.

Notice of Reasons for Refusal dated Jul. 9, 2019, received for JP Application 2019-519788, 9 pages including English Translation.

Decision to Grant dated Nov. 5, 2019, received for JP Application 2019-519788, 5 pages including English Translation.

Wahab et al, Optimization of Laser Cutting Parameters on the Laminated Carbon Fibre Reinforced Plastics (CFRP) Composites Using DOE Technique, 2014, Applied Mechanics and Materials, vol. 660, pp. 60-64 (Year: 2014).

Henry et al, Cutting Flexible Printed Circuit Board with a 532nm Q-Switched Diode Pumped Solid State Laser, Paper #M804, Laser Microfabrication Conference, ICALEO, 2005, pp. 412-419 (Year: 2005).

Office Action dated Sep. 8, 2021, in corresponding U.S. Appl. No. 17/289,235, 14 pages.

Office Action dated Dec. 15, 2021, in corresponding U.S. Appl. No. 17/289,235, 10 pages.

Office Action dated Mar. 21, 2022, in corresponding U.S. Appl. No. 17/289,235, 14 pages.

Office Action dated Feb. 9, 2022, in corresponding German patent Application No. 112018008110.9, 12 pages.

U.S. Advisory Action dated Sep. 6, 2022, in U.S. Appl. No. 17/289,235.

Marczak et al, Laser interference patterning of diamond-like carbon layers for directed migration and growth of smooth muscle cell depositions, Optica Applicata, vol. XLIV, No. 4, 2014 (Year: 2014).

Wan et al, Effect of laser spot overlap ratio on surface characteristics and adhesive bonding strength of an Al alloy processed by nanosecond pulsed laser, Journal of Manufacturing Processes 62 (2021) 555-565 (Year: 2021).

Decision of Refusal dated Aug. 3, 2022, in Chinese Application No. 201880099853.1.

|  | CFRP | | GFRP | |
|---|---|---|---|---|
|  | RESIN | CARBON FIBERS | RESIN | GLASS FIBERS |
| THERMAL CONDUCTIVITY [W/m·K] | 0.3 | 100 TO 800 | 0.3 | 1 |
| MELTING POINT [°C] | 250 OR LOWER | 2000 TO 3500 | 250 OR LOWER | 800 | ro<0

0<ro<0.5

| THICKNESS (mm) | 1 | | 2 | |
|---|---|---|---|---|
| PROCESSING SPEED v (m/min) | 0.2 | 6 | 0.2 | 6 |
| FREQUENCY f (Hz) | 21 | 650 | 21 | 700 |
| PULSE ENERGY (J) | 0.5 | | 1 | |
| PULSE WIDTH w ($\mu$s) | 400 | | 600 | |
| BEAM DIAMETER d ($\mu$m) | 200 | 200 | 200 | 200 |
| OVERLAP RATIO ro (%) | 21 | 23 | 21 | 29 |
| HEAT-AFFECTED ZONE h (mm) | 0.1 | | 0.15 | |

LASER PROCESSING METHOD AND LASER PROCESSING APPARATUS

CROSS-REFERENCE TO RELATED APPLICATIONS

This application is a Divisional of U.S. application Ser. No. 17/289,235, filed Apr. 28, 2021, which is based on PCT filing PCT/JP2018/044411, filed Dec. 3, 2018, the entire contents of each are incorporated herein by reference.

FIELD

The present invention relates to a laser processing method and a laser processing apparatus for cutting a workpiece by emitting laser light to the workpiece.

BACKGROUND

Fiber reinforced composite materials, such as glass fiber reinforced plastics (GFRP), composed of a base material and reinforcing fibers have recently attracted attention as strong and lightweight materials. Because the base material and the reinforcing fibers have different characteristics from each other, the fiber reinforced composite materials are known to be difficult to process. A laser processing apparatus can increase the processing speed by increasing a laser output, and may therefore be used for processing a fiber reinforced composite material when a high processing speed is required.

Patent Literature 1 describes forming a plurality of through-holes each formed by a single pulse of pulsed laser, and making through-holes adjacent to each other partly overlap each other, to cut a glass fiber reinforced resin film.

CITATION LIST

Patent Literature

Patent Literature 1: Japanese Patent Application Laid-open No. 2011-098381

SUMMARY

Technical Problem

Patent Literature 1, however, does not mention cutting of a fiber reinforced composite material containing fibers having physical properties of processing threshold and thermal conductivity that are significantly higher than those of GFRP.

For example, a carbon fiber reinforced plastic (CFRP) is composed of two types of materials, which are carbon fibers and resin, having thermal properties that are significantly different from each other, and the carbon fibers having a thermal conductivity higher than that of the resin act as a transfer path of heat generated during laser processing. In the CFRP, the carbon fibers has a melting point of about 3500° C., and the resin has a melting point of about 250° C. In this case, the temperature at a processing point during cutting is adjusted to the higher melting point, that is, to 3500° C. or higher. There is therefore a concern that, during laser processing of a CFRP, thermal damage caused during processing spreads to resin around a processed portion owing to heat transferred from carbon fibers. Thus, in cutting of the CFRP, it is desirable that one hole be made to penetrate the CFRP by a single pulse of pulsed laser in order to reduce thermal effects on the resin.

In the CFRP, when the adhesion at an interface between a fiber surface and the resin is lowered by thermal damage, the mechanical strength properties of the CFRP as a structural material are degraded, and the quality of the cut CFRP is lowered. Thus, in processing of the CFRP, spread of thermal damage to the vicinity of a processing point needs to be avoided as possible.

The present invention has been made in view of the above, and an object thereof is to provide a laser processing method capable of processing a fiber reinforced composite material with reduced thermal effect on resin in the fiber reinforced composite material.

Solution to Problem

To solve the aforementioned problems and achieve the object, a laser processing method according to the present invention is a processing method for laser processing of a workpiece made of a base material and a fiber reinforced composite material, the fiber reinforced composite material containing fibers having a thermal conductivity and a processing threshold higher than physical properties of glass fibers. The laser processing method includes a step of processing the workpiece by forming a plurality of through-holes extending through the workpiece by irradiating the workpiece with pulsed laser light from a processing head while relatively moving the workpiece and the processing head in a predetermined cutting direction. The pulsed laser light has a pulse width smaller than 1 ms and an energy density capable of forming each of the through-holes by a single pulse.

Advantageous Effects of Invention

A laser processing method according to the present invention produces an effect of enabling processing of a fiber reinforced composite material with reduced thermal effect on resin in the fiber reinforced composite material.

DESCRIPTION OF EMBODIMENTS

A laser processing method and a laser processing apparatus according to certain embodiments of the present invention will be described in detail below with reference to the drawings. Note that the present invention is not limited to the embodiments.

First Embodiment

Figure 1:
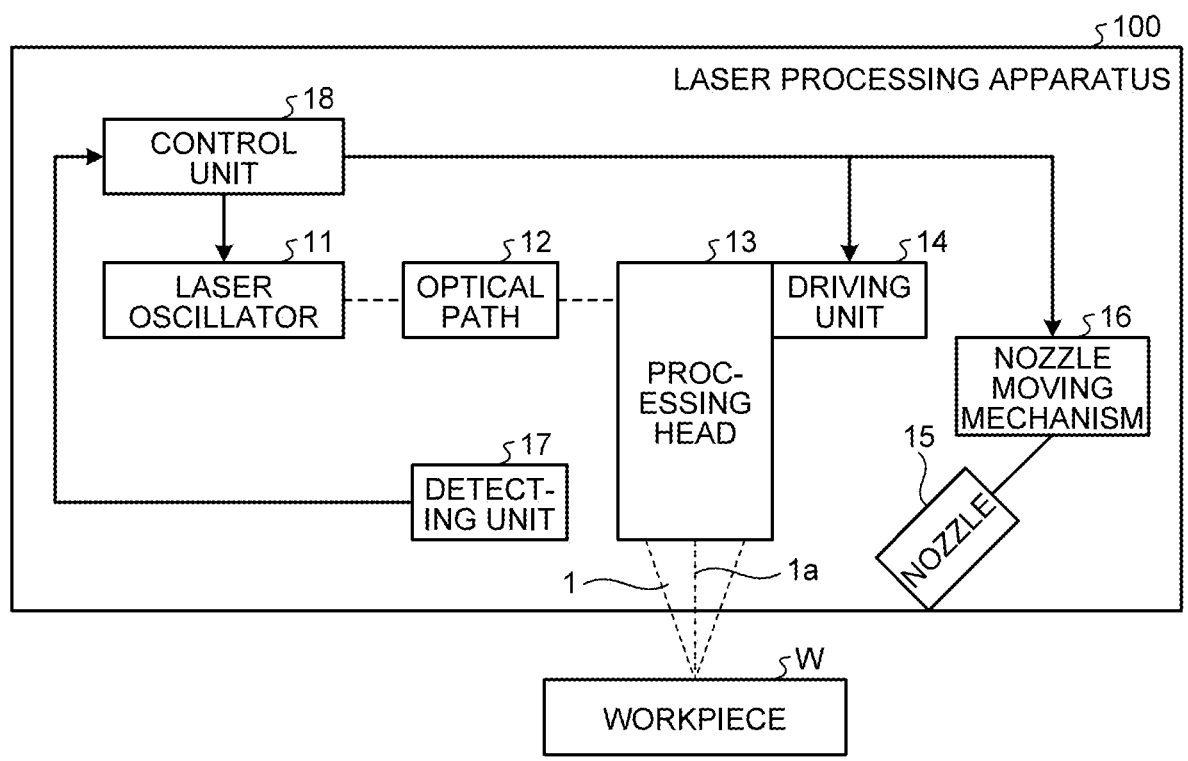
FIG. 1 is a diagram illustrating a functional configuration of a laser processing apparatus according to a first embodiment of the present invention.
Figure 2:
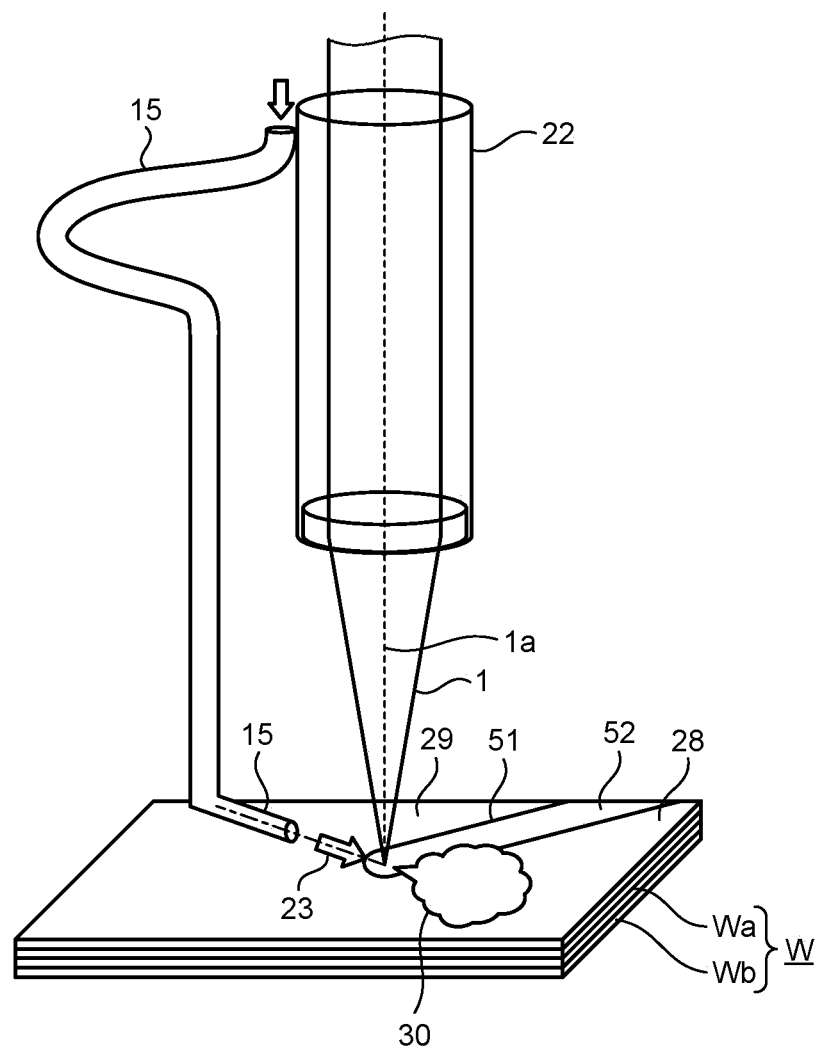
FIG. 2 is a schematic view illustrating an example of a hardware configuration of the laser processing apparatus illustrated in FIG. 1.
Figure 3:
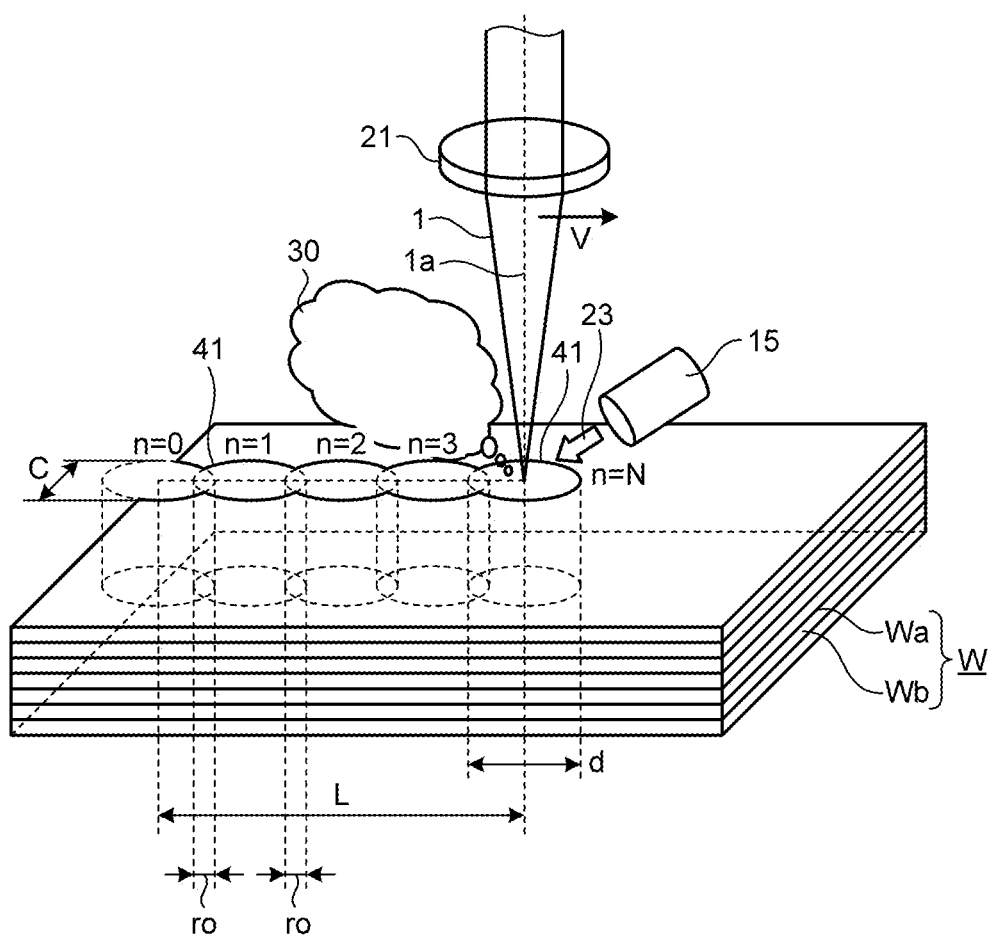
FIG. 3 is a drawing illustrating a laser processing method used by the laser processing apparatus illustrated in FIG. 1.

FIG. 1 is a diagram illustrating a functional configuration of a laser processing apparatus 100 according to a first embodiment of the present invention. FIG. 2 is a schematic view illustrating an example of a hardware configuration of the laser processing apparatus 100 illustrated in FIG. 1. FIG. 3 is a drawing illustrating a laser processing method used by the laser processing apparatus 100 illustrated in FIG. 1. FIG. 3 illustrates main part relating to laser processing performed by the laser processing apparatus 100. The laser processing apparatus 100 includes a laser oscillator 11, an optical path 12, a processing head 13, a driving unit 14, a nozzle 15, a nozzle moving mechanism 16, a detecting unit 17, and a control unit 18.

The laser processing apparatus 100 has a function of irradiating a workpiece W with pulsed laser light 1 to cut the workpiece W. The workpiece W in the first embodiment is a plate-like workpiece made of a fiber reinforced composite material including a base material and reinforcing fibers. An example of the fiber reinforced composite material is a CFRP. The CFRP is a workpiece made of a fiber reinforced composite material including a base material and a fiber having a higher thermal conductivity and a higher processing threshold than physical properties of a glass fiber.

Figures 4, 5:
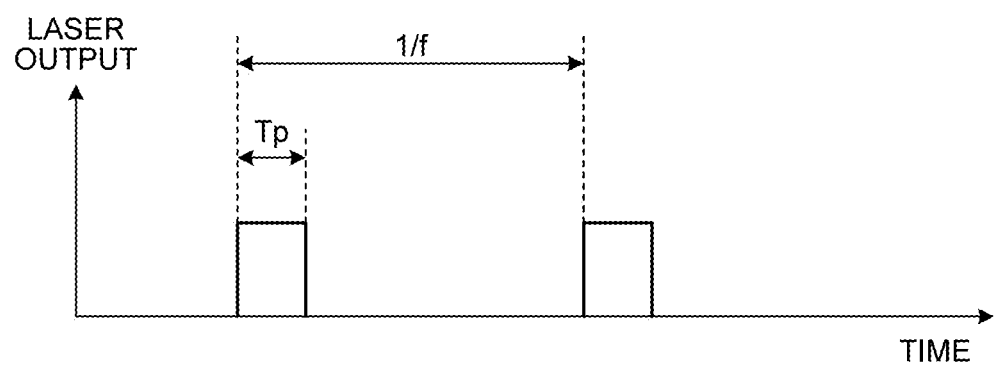
FIG. 4 is a table illustrating physical properties of a CFRP.
FIG. 5 is a graph illustrating an output waveform of a pulsed laser, which is pulsed laser light, output in the laser processing apparatus illustrated in FIG. 1, the graph illustrating the output waveform of the pulsed laser having energy capable of forming a processing hole, which is a through-hole extending through a workpiece in the thickness direction, by a single irradiation.

FIG. 4 is a table illustrating physical properties of the CFRP. In the CFRP, the reinforcing fibers are carbon fibers having a diameter in a range of equal to or larger than 5 micrometers and equal to or smaller than 10 micrometers. In the workpiece W, a plurality of reinforcing fibers are arranged along a predetermined direction. In FIG. 3, the predetermined direction is a direction from the bottom left toward the top right of the drawing.

The base material is a thermosetting resin typified by epoxy resin. The carbon fibers have a thermal conductivity in a range of equal to or higher than 100 W/m·K and equal to or lower than 800 W/m·K, which is higher than the thermal conductivity of the resin that is 0.3 W/m·K. The carbon fibers have a melting point in a range of equal to or higher than 2000° C. and equal to or lower than 3500° C., which is higher the melting point of the resin that is equal to or lower than 250° C. Thus, the carbon fibers and the resin in the CFRP have melting points and thermal conductivities that are significantly different from each other; the carbon fibers are significantly higher than the base material in both of the properties. Thus, the CFRP, which is an example of the fiber reinforced composite material is a composite material including the base material and the carbon fibers having a thermal conductivity and a processing threshold that are higher than those of the base material.

The workpiece W made of the CFRP includes carbon fibers Wa, which are reinforcing fibers, and a resin Wb, which is the base material. While FIG. 2, etc. illustrate a state in which a plurality of carbon fibers Wa are arranged in a plurality of layers in the resin Wb for convenience of illustration, more carbon fibers Wa are arranged in the predetermined direction in the resin Wb in practice. Assume that the surface of the workpiece W is on an XY plane and the direction perpendicular to the XY plane is a Z-axis direction. The emitting direction of the pulsed laser light 1 is parallel to the Z axis.

For comparison, the physical properties of the GFRP that is a workpiece in Patent Literature 1 are also illustrated in FIG. 4. FIG. 4 shows that the CFRP has a processing threshold and a thermal conductivity that are both significantly higher than those of the GFRP. Note that the high thermal conductivity of the carbon fibers means a high concern that thermal damage spreads to resin around a processed portion owing to heat transferred from carbon fibers during laser processing. The high melting point of the carbon fibers means that the carbon fibers are hard to process. Thus, the high melting point of the carbon fibers means that the carbon fibers have a high processing threshold and are hard to process. The processing threshold refers to a minimum energy density of the pulsed laser light 1 when the workpiece being irradiated with the pulsed laser light 1 starts to decompose.

The laser oscillator 11 oscillates and emits the pulsed laser light 1. The laser oscillator 11 used in the laser processing apparatus 100 according to the first embodiment is preferably a $CO_2$ laser oscillator. Thus, the pulsed laser light 1 used in the laser processing apparatus 100 according to the first embodiment is preferably a $CO_2$ laser light.

The pulsed laser light 1 emitted by the laser oscillator 11 is supplied to the processing head 13 via the optical path 12. The optical path 12 is a path for transmitting the pulsed laser light 1 emitted by the laser oscillator 11 to the processing head 13, and may be a path for propagating the pulsed laser light 1 in air or a path for transmitting the pulsed laser light 1 through an optical fiber. The optical path 12 is designed depending on the characteristics of the pulsed laser light 1.

The processing head 13 includes an optical system for focusing the pulsed laser light 1 onto the workpiece W. The processing head 13 collects the supplied pulsed laser light 1 and irradiates one surface of the workpiece W, which is a surface to be processed, with the pulsed laser light 1. The processing head 13 desirably includes an optical system that focuses near the surface of the workpiece W.

The driving unit 14 can perform control to change relative positions of the processing head 13 and the workpiece W. While the driving unit 14 changes the relative positions of the processing head 13 and the workpiece W by changing the position of the processing head 13 in the laser processing apparatus 100, the driving unit 14 may alternatively change the position of a table on which the workpiece W is placed or the positions of both of the processing head 13 and the table on which the workpiece W is placed. Thus, the driving unit 14 may include a function of changing the position of at least one of the processing head 13 and the workpiece W.

The cutting of the workpiece W is performed by the processing head 13 by irradiating the workpiece W with the pulsed laser light 1 while the driving unit 14 changes the relative positions of the processing head 13 and the workpiece W.

The nozzle 15 is a gas jet nozzle for emitting a jet of gas 23 to a portion of the workpiece W irradiated with the pulsed laser light 1 from the processing head 13. The nozzle 15 emits the jet of gas 23 from outside of the optical axis 1a of the pulsed laser light 1, which is emitted from the processing head 13 to the workpiece W, toward the optical axis 1a. More specifically, the nozzle 15 emits a jet of gas 23 from outside of the optical axis 1a of the pulsed laser light 1, which is emitted from the processing head 13 to the workpiece W, toward a processing point on the workpiece W being processed by the pulsed laser light 1. The position of the nozzle 15 is changed by the nozzle moving mechanism 16. The position of the nozzle 15 can be moved to any position by the control of the control unit 18 during the processing of the workpiece W.

The detecting unit 17 is a sensor for detecting the state of the workpiece W or the state of the laser processing apparatus 100. The detecting unit 17 measures, as time-series signals, the position of the workpiece W being processed and measured values of physical quantities such as the intensity and the wavelength of light, sound waves, and ultrasonic waves generated during the processing. The detecting unit 17 is a capacitive sensor, a photodiode, a charge coupled device (CCD) sensor, a complementary metal oxide semiconductor (CMOS) sensor, a spectroscope, an acoustic sensor, an acceleration sensor, a gyro sensor, a distance sensor, a position detector, a temperature sensor, a humidity sensor, or the like, for example. The detecting unit 17 inputs time-series signals indicating the measured values to the control unit 18.

The control unit 18 controls the laser oscillator 11, the driving unit 14, the nozzle moving mechanism 16, and the like so that the pulsed laser light 1 scans a processing path on the workpiece W in accordance with set processing conditions and the measured values transmitted from the detecting unit 17. The processing conditions include the materials, the thickness, and the surface state of the workpiece W, for example. The processing conditions further include the laser output intensity, the laser output frequency, and the duty cycle, the mode, the waveform, and the wavelength of laser output of the laser oscillator 11, and the like. The processing conditions can include the focal position of the pulsed laser light 1, the focus diameter of the pulsed laser light 1, the type and the pressure of gas emitted from the nozzle 15, the hole diameter of the nozzle, the processing speed, and the like. In addition, the processing conditions can also include the measured values input from the detecting unit 17 such as the distance between the workpiece W and the processing head 13, temperature, and humidity.

An optical unit 22 including a condenser lens 21 for focusing the pulsed laser light 1 onto a processing point is part of the processing head 13 illustrated in FIG. 1.

The laser processing apparatus 100 performs cutting, in which one surface of the workpiece W is irradiated with the pulsed laser light 1 to separate the workpiece W into a processed product 29 and an offcut 28. The processed product 29 is to be used as a part or the like after cutting, and the offcut 28 is to be waste after cutting. The position on the workpiece W to be irradiated with the pulsed laser light 1 is controlled to be moved along the processing path by the control unit 18.

Next, a method for processing a CFRP, which is the workpiece W, by the laser processing apparatus 100 will be explained. For cutting of the workpiece W, the pulsed laser light 1 is focused onto the surface of the workpiece W by the condenser lens 21 as illustrated in FIG. 3. The surface to be processed of the workpiece W is irradiated with the pulsed laser light 1 by being scanned along a predetermined cutting direction. Specifically, the relative positions of the processing head 13 and the workpiece W are changed to change the position on the workpiece W irradiated with the pulsed laser light 1.

FIG. 5 is a graph illustrating an output waveform of a pulsed laser, which is the pulsed laser light 1, output in the laser processing apparatus 100 illustrated in FIG. 1, the graph illustrating the output waveform of the pulsed laser having energy capable of forming a processing hole 41, which is a through-hole extending through the workpiece W in the thickness direction, by a single irradiation. The number of pulses of the pulsed laser light 1 with which the workpiece W is irradiated to cut the workpiece W by a cut length L is represented by N. N is a positive number equal to or larger than 2. For example, when the workpiece W is cut by a single scanning by repeating irradiation with the pulsed laser at a frequency f as illustrated in FIG. 5 while moving the irradiation position of the pulsed laser light 1 at a scanning rate v, the number N of pulses of the pulsed laser light 1 with which the workpiece W is irradiated is expressed by the following formula (1).

$$N = L \times f/v \quad (1)$$

When the diameter of the processing hole 41 processed with a single pulse of the pulsed laser light 1 in the cutting direction of the workpiece W is represented by a processing hole diameter d, an overlap ratio ro in the cutting direction of two processing holes that are adjacent to each other in the cutting direction, that is, the overlap of the processing holes in the cutting direction is expressed by formula (2) below. The cutting direction of the workpiece W is the same as the scanning direction of the pulsed laser light 1. The overlap ratio ro is a ratio of the length by which two processing holes that are adjacent to each other in the cutting direction overlap each other in the cutting direction to the processing hole diameter d. The processing hole diameter d is equal to the focus diameter of the pulsed laser light 1. In other words, the processing hole diameter d is the focus diameter d of the pulsed laser light 1 in the cutting direction of the workpiece W. Note that, in the drawings such as FIG. 3, the processing hole diameter d is illustrated as being larger than the focus diameter of the pulsed laser light 1 for ease of understanding of the overlapping state of the processing holes.

$$ro = (d - L/N)/d \quad (2)$$

In addition, in the first embodiment, laser processing is performed with the overlap ratio ro within a range of larger than 0 and smaller than 0.5 as expressed by the following formula (3).

$$0 < ro = (d - L/N)/d < 0.5 \quad (3)$$

Figure 6:
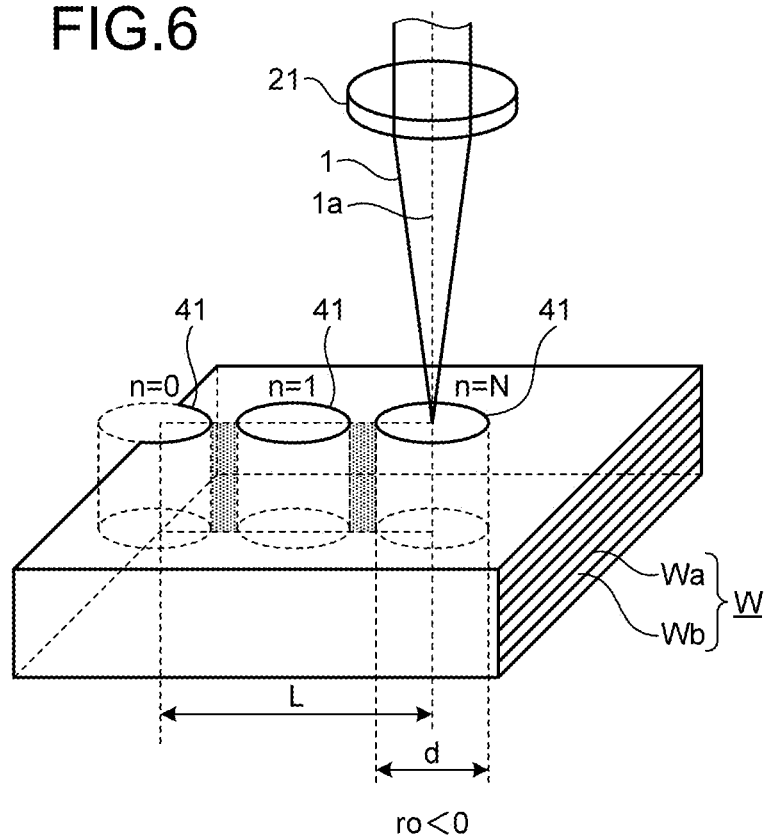
FIG. 6 is a schematic view illustrating a processing state when the processing conditions of processing of a workpiece with the pulsed laser light do not meet the condition of formula (3), and specifically, when an overlap ratio is smaller than 0.
Figure 7:
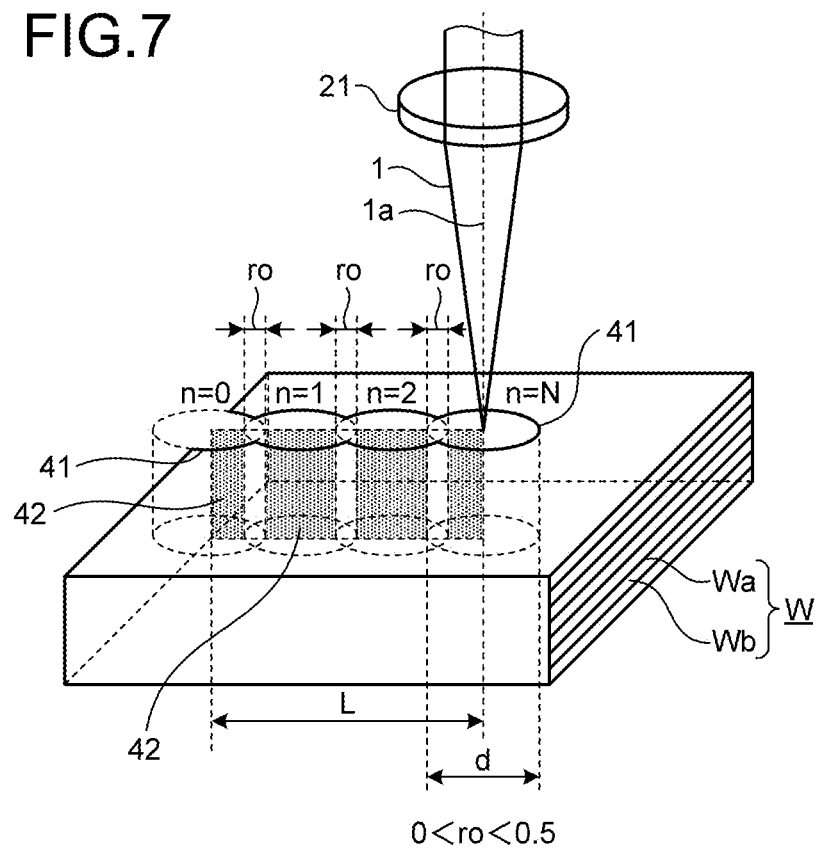
FIG. 7 is a schematic view illustrating a processing state when the processing conditions of processing of the workpiece with the pulsed laser light meet the condition of formula (3).
Figure 8:
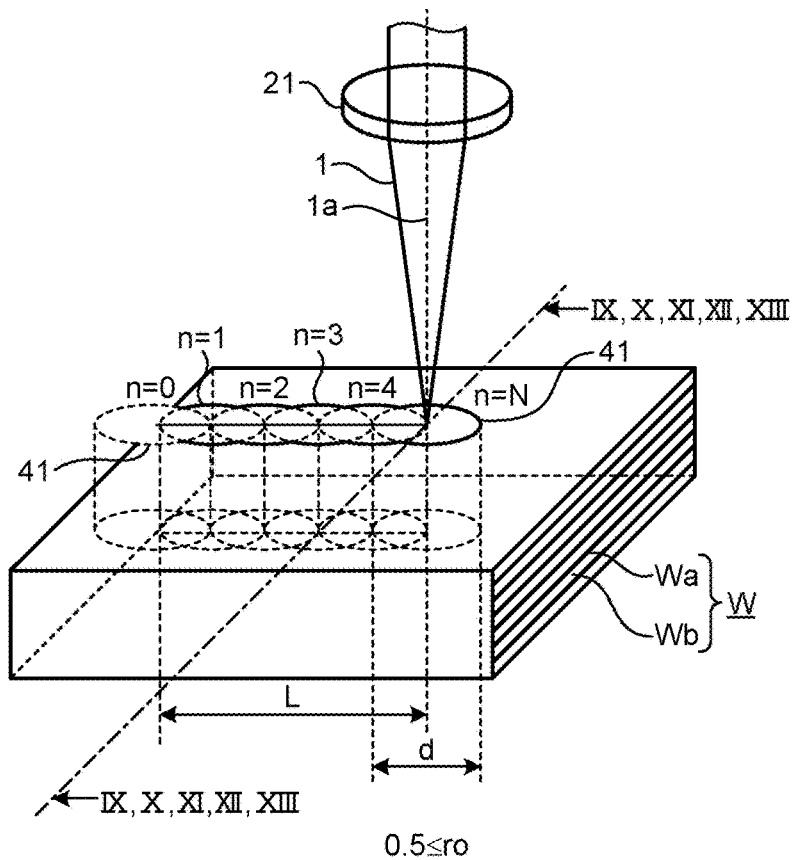
FIG. 8 is a schematic view illustrating a processing state when the processing conditions of processing of a workpiece with the pulsed laser light do not meet the condition of formula (3), and specifically, when the overlap ratio is equal to or larger than 0.5.

Next, the capability of cutting through the workpiece W by a single pulse of pulsed laser light 1 emitted in such a manner as to meet the condition of formula (3) above will be explained. FIGS. 6 to 8 are schematic views illustrating the states of the workpiece W processed by the pulsed laser light 1 when the overlap ratio ro is changed. FIG. 6 is a schematic view illustrating a processing state when the processing conditions of processing of the workpiece W with the pulsed laser light 1 do not meet the condition of formula (3), and specifically, when the overlap ratio ro is smaller than 0. FIG. 7 is a schematic view illustrating a processing state when the processing conditions of processing of the workpiece W with the pulsed laser light 1 meet the condition of formula (3). FIG. 8 is a schematic view illustrating a processing state when the processing conditions of processing of the workpiece W with the pulsed laser light 1 do not meet the condition of formula (3), and specifically, when the overlap ratio ro is equal to or larger than 0.5. In FIGS. 6 to 8, the nozzle 15 is not illustrated.

As illustrated in FIG. 6, the case where the processing conditions of processing of the workpiece W with the pulsed laser light 1 do not meet the condition of formula (3), and specifically, where the overlap ratio ro is smaller than 0 means a case where the processing holes 41 that are adjacent to each other in the cutting direction do not overlap each other in the cutting direction. Thus, the workpiece W cannot be cut by the processing illustrated in FIG. 6.

As illustrated in FIG. 8, in the case where the processing conditions of processing of the workpiece W with the pulsed laser light 1 do not meet the condition of formula (3), and specifically, where the overlap ratio ro is equal to or larger than 0.5 and the overlap of two adjacent processing holes 41 in the cutting direction is larger than the condition of formula (3), the irradiation with the pulsed laser light 1 is performed twice or more times over the entire cut length L. In this case, an excessive quantity of heat, which does not contribute to cutting, input to the workpiece W increases, causing an unnecessary thermal effect from the inner face of the processing hole 41 onto the surrounding resin Wb. In addition, the number of times of irradiation with the pulsed laser light 1 necessary for cutting the cut length L increases, and use of laser energy increases.

In contrast, the case illustrated in FIG. 7 is a case where the processing conditions of processing of the workpiece W with the pulsed laser light 1 meet the condition of formula (3), and only energy corresponding to a single pulse of the pulsed laser light 1 is input to a dot-hatched processing region 42 within the cut length L in FIG. 7. The capability of cutting the cut length L of the workpiece W in this state indicates that processing holes 41 extending through the workpiece W in the thickness direction are each formed with energy corresponding to a single pulse of the pulsed laser light 1 to perform cutting.

Specifically, in the case illustrated in FIG. 7, within the region in which the processing holes are formed, the cut length L is cut in a state in which a region irradiated with the pulsed laser twice in the scanning direction of the pulsed laser light 1 is smaller than that in the case illustrated in FIG. 8. Specifically, in the case where the processing conditions of processing of the workpiece W by the pulsed laser light 1 meet the condition of formula (3) as illustrated in FIG. 7, in the laser processing method of performing cutting by repeating irradiation with a single pulsed laser while moving the pulsed laser light 1, a processing hole 41, which is a through-hole extending through the workpiece W, is formed by a single irradiation with the pulse laser to cut the workpiece W. In this manner, the workpiece W can be cut with a reduced thermal effect on the resin Wb in the workpiece W.

Note that, in FIG. 7, a processing hole 41 with a semicircular opening shape is formed by irradiation with the pulsed laser light 1 when n=0. In addition, a processing hole 41 with a circular opening shape is formed by irradiation with the pulsed laser light 1 when n=N. Note that part of the processing hole 41 formed when n=N that is necessary for cutting the cut length L is the part with a semicircular opening shape adjacent to the processing hole 41 formed when n=N−1. Thus, a combination of the part having the semicircular opening shape of the processing hole 41 formed when n=0 and the part having the semicircular opening shape of the processing hole 41 formed when n=N can be regarded as one circular processing hole 41. Thus, in the case illustrated in FIG. 7, the number of pulses of the pulsed laser light 1 with which the workpiece W is irradiated to cut the cut length L of the workpiece W can be assumed to be N.

For cutting of the workpiece W by the laser processing apparatus 100, the control unit 18 controls to change the relative positions of the processing head 13 and the workpiece W by controlling the driving unit 14 to meet the condition of formula (3) above. Thus, for performing cutting of the workpiece W, the control unit 18 controls the relative positions of the irradiation position of the pulsed laser light 1 and the workpiece W to meet the condition of formula (3) above.

While the overlap ratio ro is in the range of "0<ro<0.5" as described above in the first embodiment, the overlap ratio ro is more preferably as small as possible within the "0<ro<0.5", that is, as close to 0 as possible. When the overlap ratio ro is as small as possible, the pulsed laser light 1 with which part of a through-hole that already extends through the workpiece W is irradiated again can be reduced, and input of excessive heat, which does not contribute to cutting, to the workpiece W can be reduced.

An optimum value of the overlap ratio ro is 0.2. When the overlap ratio ro is 0.2, the cutting speed is not decreased, and a cut end face becomes smoother. Thus, when the overlap ratio ro is 0.2, decrease in the processing speed can be prevented and higher smoothness of a cut end face can be achieved even with the processing holes 41 overlapping each other.

The advantageous effects of cutting the workpiece W by forming a hole through the workpiece W by a single irradiation of a pulsed laser by the laser processing method for processing the workpiece W according to the first embodiment as described above will be explained in comparison with a laser processing method according to a comparative example in which hole processing is repeated a plurality of times in the depth direction of the workpiece W to cut the workpiece W.

Figure 9:
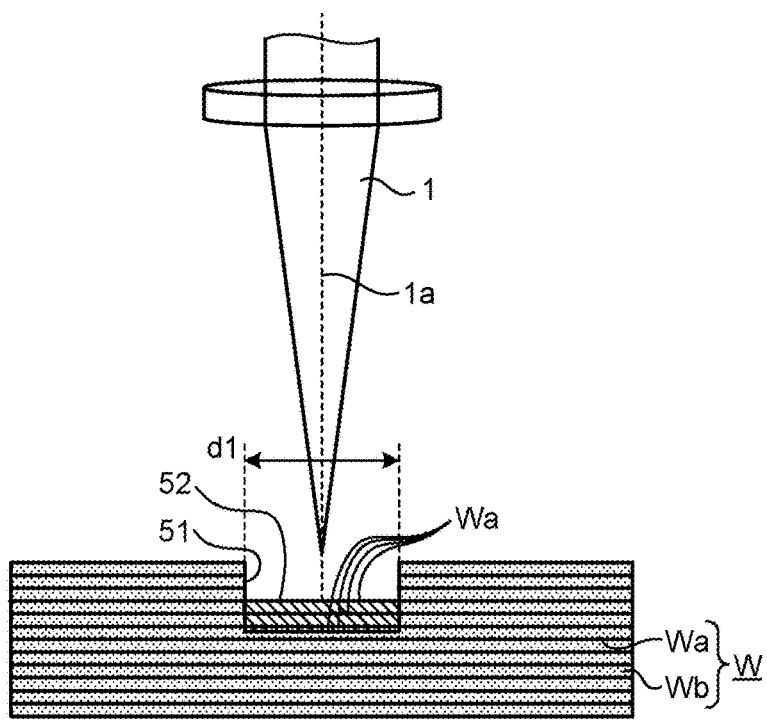
FIG. 9 is a schematic cross-sectional view illustrating a state immediately after a first irradiation of a processing point of the workpiece with the pulsed laser light.
Figure 10:
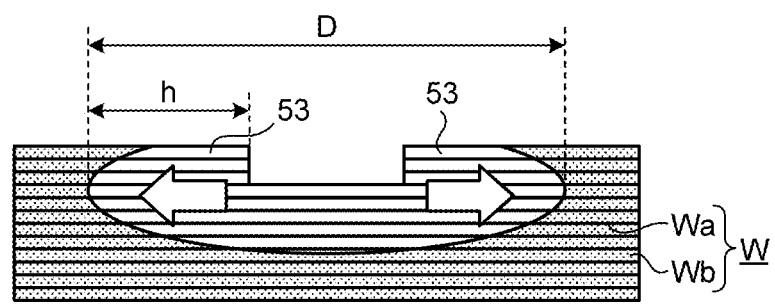
FIG. 10 is a schematic cross-sectional view illustrating a state during a period for which a bottom part of a hole is let stand after the first irradiation of the processing point of the workpiece with the pulsed laser light.
Figure 11:
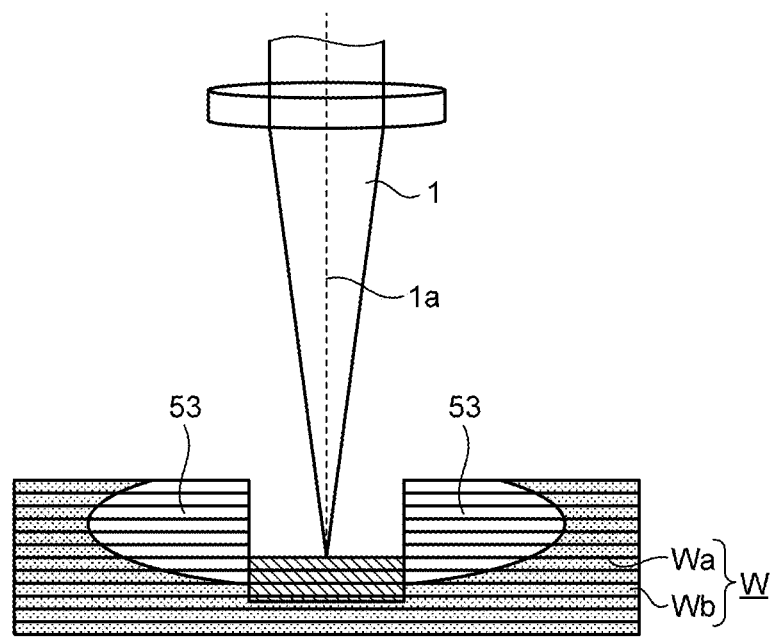
FIG. 11 is a schematic cross-sectional view illustrating a state immediately after a second irradiation of the processing point of the workpiece with the pulsed laser light.
Figure 12:
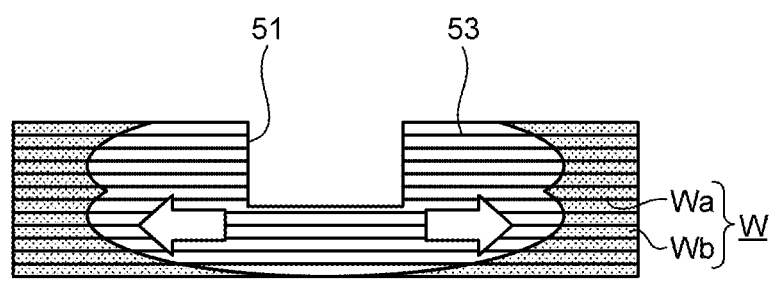
FIG. 12 is a schematic cross-sectional view illustrating a state during a period for which the bottom part of the hole is let stand after the second irradiation of the processing point of the workpiece with the pulsed laser light.
Figure 13:
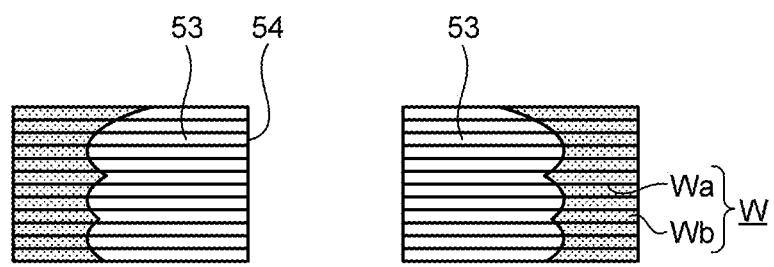
FIG. 13 is a schematic cross-sectional view illustrating a state after the processing point of the workpiece is irradiated with the pulsed laser light a plurality of times and a through-hole is thus formed through the workpiece.

In the laser processing method of the comparative example explained below, a through-hole that extends through the workpiece W is not formed by a single irradiation of the pulsed laser light 1, but a through-hole that extends through the workpiece W is formed by irradiating one position with the pulsed laser light 1 a plurality of times to cut the workpiece W. FIG. 9 is a schematic cross-sectional view illustrating a state immediately after a first irradiation of a processing point of the workpiece W with the pulsed laser light 1. FIG. 10 is a schematic cross-sectional view illustrating a state during a period for which a bottom part 52 of a hole 51 is let stand after the first irradiation of the processing point of the workpiece W with the pulsed laser light 1. FIG. 11 is a schematic cross-sectional view illustrating a state immediately after a second irradiation of the processing point of the workpiece W with the pulsed laser light 1. FIG. 12 is a schematic cross-sectional view illustrating a state during a period for which the bottom part 52 of the hole 51 is let stand after the second irradiation of the processing point of the workpiece W with the pulsed laser light 1. FIG. 13 is a schematic cross-sectional view illustrating a state after the processing point of the workpiece W is irradiated with the pulsed laser light 1 a plurality of times and a through-hole is thus formed through the workpiece W. FIGS. 9 to 13 correspond to cross sections along line IX-IX, line X-X, line XI-XI, line XII-XII, and line XIII-XIII, respectively, in FIG. 8.

For ease of understanding, assume that the pulsed laser light 1 has a top-hat beam profile and that the workpiece W is processed in conformity with the beam shape. At the bottom part 52 of the hole 51 formed by irradiation of the workpiece W with the pulsed laser light 1 immediately after the first irradiation of the processing point of the workpiece W with pulsed laser light 1, carbon fibers Wa that remain at a high temperature are present because input energy has not reached the processing threshold, that is, the temperature thereof has not reached the melting point.

The melting point of the carbon fibers Wa is about 3500° C. The carbon fibers Wa remain at a temperature close to 3500° C. without being removed. In addition, until the hole 51 is irradiated with next laser light 1, the heat of the carbon fibers Wa remaining at a high temperature at the bottom part 52 of the hole 51 is transferred to the resin Wb around the hole 51 through the carbon fibers Wa, which have a thermal conductivity significantly higher than that of the resin, and a heat-affected zone 53 is thus formed. The heat of the carbon fibers Wa is transferred downward beneath the hole 51 and in outward directions away from the hole 51 as indicated by arrows in FIG. 10.

The heat-affected zone 53 is a region of the resin Wb affected by heat resulting from a temperature increase by the heat of carbon fibers Wa, which remain at a high temperature at the bottom part 52 of the hole 51, the heat being transferred through the carbon fibers Wa. The heat transfer of the heat of the carbon fibers Wa, which remain at a high temperature at the bottom part 52 of the hole 51, through the carbon fibers Wa is generated after the first irradiation with the pulsed laser light 1 and before the second irradiation with the pulsed laser light 1, during a let-stand period for which the high-temperature carbon fibers Wa at the bottom part 52 of the hole 51 are let stand.

The quantity of heat transferred from the carbon fibers Wa to the resin Wb during this period is a large heat quantity for the resin, which is a base material having a melting point of 250° C. or lower and a low processing threshold. Assume that the heat of the carbon fibers having a temperature of about 3500° C. and a length of a hole diameter d1 at the bottom part 52 of the hole 51 is transferred to the resin Wb through the carbon fiber Wa. In this case, a length D of a range in which the resin Wb, which is the base material, reaches the processing threshold in the extending direction of the carbon fibers Wa is expressed by formula (4) below and, which is 14 times the hole diameter d1 of the bottom part 52. The range length D corresponds to a range with its center as the central axis of the hole 51 in the extending direction of the carbon fibers Wa.

$$D = d1 \times 3500/250 = 14 \times d1 \qquad (4)$$

When the hole diameter d1 is 0.2 mm, D becomes 2.8 mm, and the length h of the heat-affected zone 53 in the extending direction of the carbon fibers Wa is h=2.8/2−0.2/2=1.3 mm, which is significantly larger than the hole diameter d1. The length h of the heat-affected zone 53 is a length in the extending direction of the carbon fibers Wa from an open end of the hole 51 to an outer end of the heat-affected zone 53 in the extending direction of the carbon fibers Wa.

In the heat-affected zone 53, the adhesion at the interfaces between the carbon fibers Wa and the resin Wb is lowered by thermal damage, the mechanical strength properties of the workpiece W as a structural material are degraded, and the quality of the cut workpiece W is lowered, the degree of which varies depending on the energy of the pulsed laser light 1.

Subsequently, when a cutting position of the workpiece W where the hole 51 is formed is irradiated with the pulsed laser light 1 for the second time, the hole 51 becomes deeper, and another heat-affected zone 53 that expands downward and outward from the heat-affected zone 53 formed by the first irradiation with the pulsed laser light 1 is formed during a let-stand period until next irradiation with the pulsed laser light 1 is performed, as illustrated in FIG. 12.

Subsequently, irradiations with third and subsequent pulses of the pulsed laser light 1 are performed until the depth of the hole 51 reaches the thickness of the workpiece W and the through-hole is formed. After each of irradiations with the third and subsequent pulses of the pulsed laser light 1, a heat-affected zone 53 is also produced in a manner similar to the above. As a result of irradiation with the pulsed laser light 1 a plurality of times, a through-hole 54 is finally formed as illustrated in FIG. 13. Scanning with the pulsed laser light 1 is thus performed in the cutting direction to form a plurality of through-holes 54 in such a manner that through-holes 54 adjacent to each other overlap each other, the through-holes 54 adjacent to each other communicate each other in the cutting direction, and the workpiece W is thus cut.

In addition, heat-affected zones 53 generated by the heat of the carbon fibers Wa, which remain at a high temperature at the bottom part 52 of the hole 51 during let-stand periods after irradiation with the pulsed laser light 1 and before next irradiation with the pulsed laser light 1, the heat being transferred through the carbon fibers Wa, are present around the through-holes 54 formed as described above, which degrades the quality of the cut workpiece W.

The phenomenon described above is a phenomenon unique to the fiber reinforced composite material. For cutting one position on a workpiece made of a single material in the depth direction by a plurality of times of processing, the temperature of a bottom part of a hole formed during the cutting is equal to or lower than a processing threshold in a manner similar to the above. Thus, even when the heat at the bottom part of the hole is transferred to a region around the hole, the region around the hole is not processed.

In contrast, in the laser processing apparatus 100 according to the first embodiment described above, cutting is performed by pulsed laser having energy capable of forming a through-hole extending through the workpiece W in the thickness direction by a single irradiation of the pulsed laser light 1. This can eliminate the phenomenon of transfer of heat of the carbon fibers Wa, which remain at a high temperature at the bottom part 52 of the hole 51 during the let-stand period described above, through the carbon fibers Wa, and prevent generation of the heat-affected zones 53. Thus, in the laser processing apparatus 100 according to the first embodiment described above, no heat accumulated in the carbon fibers Wa remaining at a bottom part of a hole formed during cutting is transferred to the resin Wb around the hole through the carbon fibers Wa, which prevents the resin Wb having a processing threshold lower than that of the carbon fibers Wa from being heated and thus prevents generation of heat-affected zones 53. As a result, thermal effects of the workpiece W on the resin Wb during laser processing of the workpiece W can be reduced, which prevents degradation in the mechanical strength properties of the cut workpiece W caused by cutting, and enables cutting with high quality.

In addition, in the laser processing apparatus 100, the number of times of scanning with the pulsed laser light 1 for cutting is one, which results in a short cutting time. Thus, the laser processing apparatus 100 enables laser cutting of a workpiece W with high quality and high efficiency.

To reduce generation of a heat-affected zone 53 during a let-stand period after the first irradiation with the pulsed laser light 1 and before the second irradiation with the pulsed laser light 1 described above, the quantity of heat accumulated at the bottom part 52 of the hole 51 may be reduced by performing scanning with the pulsed laser light 1 by using a galvanometer scanner, for example, and setting a scanning time interval of 100 ms or longer before next irradiation with the pulsed laser light 1.

As the scanning rate of the pulsed laser light 1 is higher, however, the processing depth of a hole formed per a single irradiation with the pulsed laser light 1 is smaller, the number of times of irradiation with the pulsed laser light 1 needs to be significantly increased, which increases the processing time.

In addition, when a processing area of the workpiece W is large, the laser processing apparatus 100 has no downtime if another processing point on the workpiece W is processed during the scanning time interval of the pulsed laser light 1. In a case where a galvanometer scanner is used, however, the processing area is as small as about 100 mm, and other points on the workpiece W cannot be continuously processed.

Assume, for example, a case where a hole having a diameter of 9.5 mm and a circumference of 30 mm is processed. For example, when the scanning rate v of the pulsed laser light 1 is 6 m/s and the downtime is 300 ms, the scanning time is 30 mm/6 m/s×20 times=100 ms, which is relatively short, even if the number of times of irradiation with the pulsed laser light 1 is 20. In the meantime, the downtime is 300 ms×20 times=6000 ms. Thus, the whole processing time, which is a sum of the scanning time and the downtime is 6.1 s. The processing speed obtained by conversion of the processing time is 0.3 m/min, which is a laser processing speed lower than the speed of laser processing of a typical CFRP.

The laser oscillator 11 used in the laser processing apparatus 100 according to the first embodiment is preferably a $CO_2$ laser oscillator. Thus, for the pulsed laser light 1 used in the laser processing apparatus 100, $CO_2$ laser light produced by oscillation of a $CO_2$ laser oscillator is suitable. For example, laser light produced by oscillation of a fiber laser is not absorbed by resin. Thus, in a case where laser light produced by oscillation of a fiber laser is used, resin is thermally removed by heat transferred from carbon fibers to the resin. In contrast, $CO_2$ laser light is absorbed by resin at a higher rate than laser light produced by oscillation of a fiber laser, and thus enables processing of a through-hole in a shorter time because the heat transfer time is unnecessary and with a smaller quantity of input heat. Thus, use of $CO_2$ laser light in the laser processing apparatus 100 enables cutting with higher efficiency and smaller thermal effects.

Figure 14:
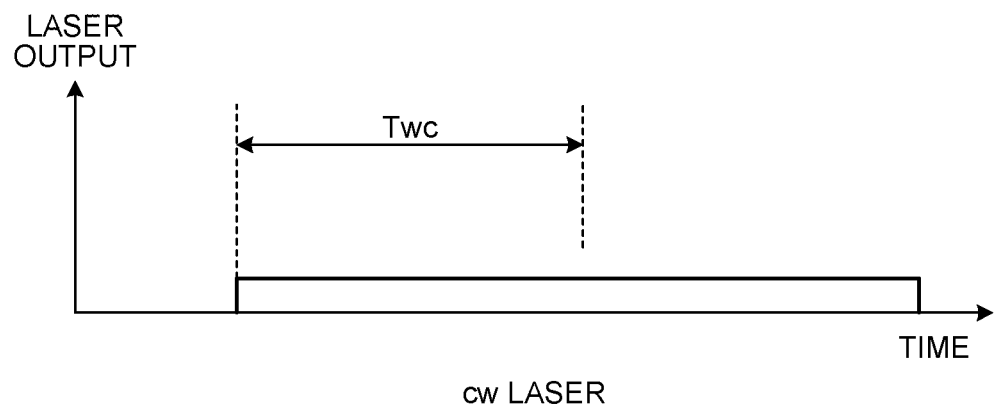
FIG. 14 is a graph illustrating an output waveform of a CW laser in a case where cutting is performed by the CW laser at the same processing speed as the pulsed laser having the output waveform illustrated in FIG. 5.

Next, differences between the laser processing method using the pulsed laser as described above performed by the laser processing apparatus 100 according to the first embodiment and the laser processing method using a continuous wave (CW) laser that continuously emits laser light will be explained. FIG. 14 is a graph illustrating an output waveform of a CW laser in a case where cutting is performed by the CW laser at the same processing speed as the pulsed laser having the output waveform illustrated in FIG. 5. The same processing speed means that an average output of the pulsed laser having the output waveform illustrated in FIG. 5 is equal to that of the CW laser having the output waveform illustrated in FIG. 14.

Note that, as illustrated in FIG. 14, the CW laser output is lower than the pulsed laser output illustrated in FIG. 5. In addition, as illustrated in FIGS. 14 and 5, a processing time Twc required for processing of one through-hole extending through the workpiece W in the thickness direction in performing cutting using a CW laser is significantly longer than the processing time Tp required for processing of one through-hole extending through the workpiece W in the thickness direction in performing cutting using a pulsed laser. In addition, the processing time Twc is equal to the time 1/f from an end of processing of one through-hole to a start of processing of a second through-hole in performing cutting using a pulsed laser. Thus, the time required for processing of one through-hole extending through the workpiece W in the thickness direction is longer for processing using a CW laser than for processing using a pulsed laser.

Because a bottom part of a hole irradiated with a laser in the process of formation of a through-hole is immediately below the portion where the workpiece W is removed, the bottom part is close to the processing threshold, has a temperature that is approximately the melting point, which is about 3500° C. regardless of the laser output. In a case where a CW laser is used, the time during which a bottom part of a hole is present in the process of formation of a through-hole is approximated to the processing time Twc. In a case where a pulsed laser (w) is used, the time during which a bottom part of a hole is present in the process of formation of a through-hole is approximated to the processing time Tp.

In addition, in the case where the pulsed laser (w) is used, because the time during which a bottom part of a hole is present in the process of formation of a through-hole is shorter than that in the case where the CW laser is used, the heat transfer from the bottom part of the hole to the vicinity of the hole can be reduced and the thermal effects on the resin Wb around the hole can be reduced accordingly.

In particular, the processing time Twc required for processing of one through-hole by using the CW laser is Twc=1/f={d(1−ro)}/v. Thus, because the processing time Twc is longer as the scanning rate v is lower, the processing quality is lower as the scanning rate v is lower even when the laser output is small.

In contrast, with the laser processing method according to the first embodiment using the pulsed laser, because the processing time Tp required for processing of one through-hole does not depend on the scanning rate v, good cutting quality can be achieved even with a low scanning rate v.

Next, a pulse width in the laser processing method according to the first embodiment using the pulsed laser as described above will be explained. As described above, in the laser processing method according to the first embodiment, the time during which a bottom part of a hole is present in the process of formation of a through-hole is approximated to the processing time Tp. Thus, the pulse width of the pulsed laser of the pulsed laser light 1 in the laser processing method according to the first embodiment is preferably as short as possible. In addition, as presented in a specific example described later, when the pulse width of the pulsed laser light 1 is equal to or larger than 1 ms, the heat-affected zone 53 is large. Thus, the pulse width of the pulsed laser light 1 is preferably smaller than 1 ms.

In addition, when a peak output of the pulsed laser light 1 exceeds 150 Kw, a phenomenon, called air breakdown, of the atmosphere being changed into plasma occurs. The atmosphere changed into plasma absorbs and scatters the pulsed laser light 1, which degrades the cutting quality. As will be described later, a minimum required pulse energy for forming a through-hole by a single pulse of the pulsed laser light 1 through a workpiece made of a CFRP with a polyacrylonitrile (PAN)-based carbon fiber content of 70% and a thickness of 1 mm is 0.15 J. The pulse width is calculated to be $0.15/150000 = 1e^{-6}[s] = 1[\mu s]$. Thus, although the pulse width is preferably as short as possible, cutting can be performed without degrading the cutting quality by setting the lower limit of the pulse width of the pulsed laser light 1 to 1 μs.

It is known that a fiber reinforced composite material can be cut with high processing quality by setting the pulse width of the pulsed laser light to an order of picosecond smaller than nanosecond. In this case, however, the output of the laser oscillator is as low as about 10 W, which results in a very long processing time.

As described above, in the laser processing method according to the first embodiment, because the overlap ratio ro is set smaller than 0.5, a plurality of processing holes 41 formed along the cutting direction of the workpiece W each have a small opening at a boundary with an adjacent processing hole 41. In addition, the bottom part of a hole is closed until the hole penetrates the workpiece W in the process of formation of a processing hole 41. Thus, until a hole penetrates the workpiece W in the process of formation of a processing hole 41, an exit from the hole for a decomposition product 30 generated during cutting is only present in an upward direction toward the side of the pulsed laser light 1 radiation, that is, toward the processing head 13 in the axial direction of the optical axis 1a of the pulsed laser light 1. The decomposition product 30 is therefore intensely blown upward from the inside of the hole toward the side of the pulsed laser light 1 radiation.

In particular, because the processing threshold of carbon fibers is higher than that of glass fibers as illustrated in FIG. 4 and carbon fibers need to be processed by a pulsed laser with high pulse energy, a jet of the decomposition product 30 out of the hole is very intense.

In addition, in a case where a recent laser oscillator that generates a high peak power is used and the pulse width is set smaller than 1 ms in order to reduce the thermal effects on a workpiece during cutting, a decomposition product is intensely ejected from a hole in the process of formation of a through-hole. According to experiments conducted by the inventors, in a case where cutting of a workpiece W is performed with use of a laser oscillator that generates a high peak power and with a pulse width set smaller than 1 ms, the ejecting rate of a decomposition product 30 from a hole in the process of formation of a through-hole is found to reach as high as 100 m/s. The peak power is defined as pulse energy (J)=pulse width (s)×peak power (W).

In addition, as shown by formula (4) described above, the hole diameter d1 of the bottom part 52 of a hole in the process of formation of a through-hole is preferably small in order to reduce the thermal effects on the resin Wb during cutting. This is also applicable to cutting by the laser processing method for processing a workpiece W according to the first embodiment, and the hole diameter of a through-hole formed by the pulsed laser light 1 is preferably small in order to reduce the thermal effects on the resin Wb during irradiation with the pulsed laser light 1. When the hole diameter of the through-hole is small, however, the hole diameter of a hole in the process of formation of the through-hole is also small, and the aspect ratio of the hole is large, which makes the ejecting rate of the decomposition product 30 from the hole high.

In addition, the decomposition product 30 is ejected in the axial direction of the optical axis 1a of the pulsed laser light 1. Thus, when cutting is performed in a state in which the decomposition product 30 is let stand, the decomposition product 30 absorbs the pulsed laser light 1 or scatters the pulsed laser light 1, which degrades the processing quality and the processing speed.

Figure 15:
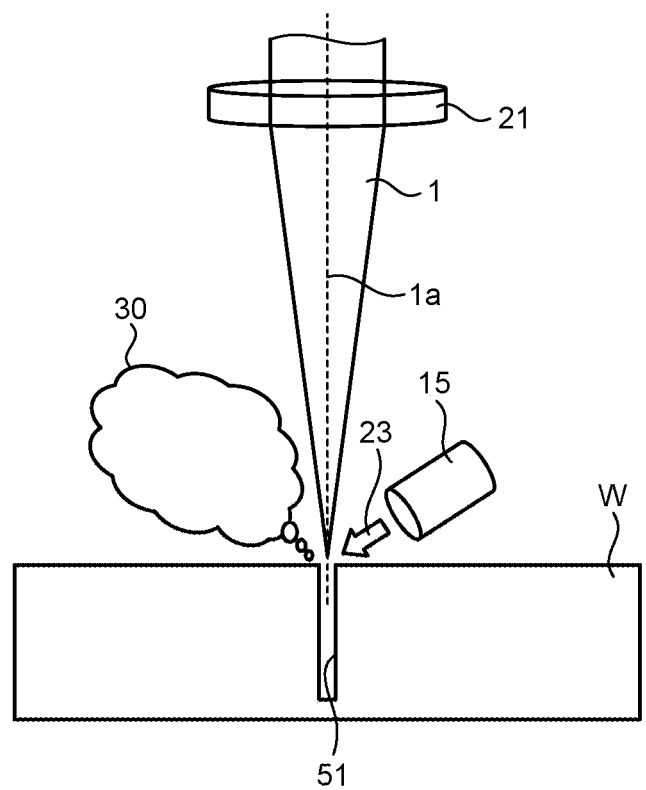
FIG. 15 is a diagram illustrating an example in which a nozzle, which is a side flow nozzle for emitting a jet of gas from outside of an optical axis toward the optical axis, is used.
Figure 16:
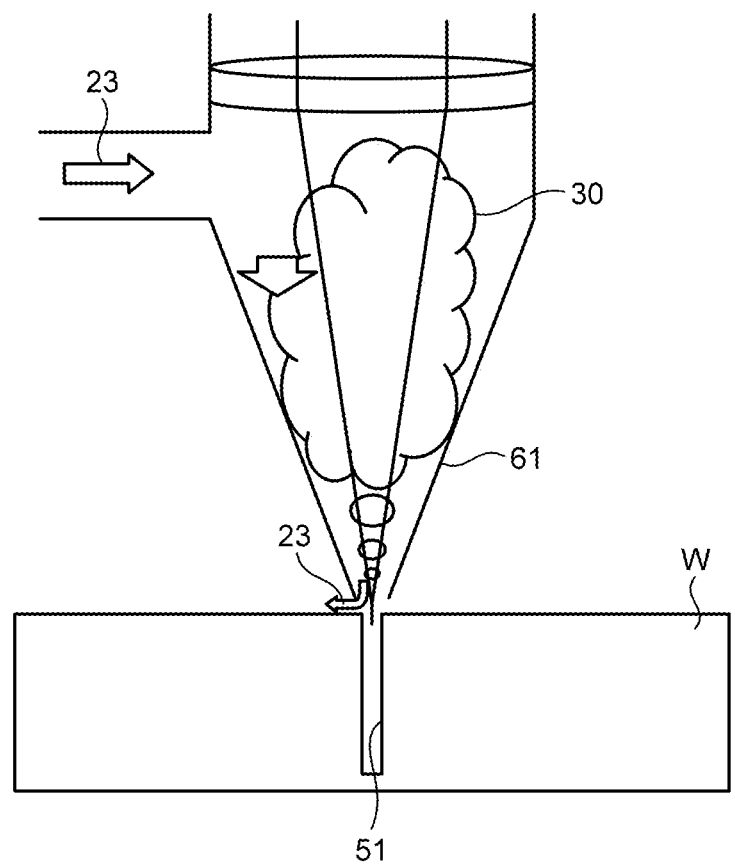
FIG. 16 is a diagram illustrating an example in which an axial nozzle for emitting a jet of gas from a direction along the optical axis toward a processing point is used.

In the laser processing apparatus 100, the nozzle 15, which is a side flow nozzle, is therefore used to solve the aforementioned problem. FIGS. 15 and 16 are diagrams explaining advantageous effects of the laser processing apparatus 100 illustrated in FIG. 1. FIG. 15 is a diagram illustrating an example in which the nozzle 15, which is a side flow nozzle for emitting a jet of gas 23 from outside of the optical axis 1a toward the optical axis 1a, is used in a manner similar to the laser processing apparatus 100 illustrated in FIG. 2. FIG. 16 is a diagram illustrating an example in which an axial nozzle 61 for emitting a jet of gas 23 from a direction along the optical axis 1a toward a processing point is used, which is a comparative example typically used in cutting of a sheet metal.

In the case where the axial nozzle 61 is used, the flow rate of the gas 23 is lowered because the bottom of a hole present in the axial flowing direction of the gas 23 is closed. In addition, because the direction in which the gas 23 is ejected and the depth direction of the hole are coincident with each other, the decomposition product 30 is likely to enter the inside of the axial nozzle 61. Because the cross-sectional area of the flow path of the gas 23 is large and the flow rate of the gas 23 is low at portions of the axial nozzle 61 other than a narrow portion at the distal end thereof, the decomposition product having entered the axial nozzle 61 accumulates inside the nozzle, that is, on the optical axis, which absorbs laser light and degrades the focusing of laser light.

In contrast, with the side flow nozzle, because the jet of gas 23 is emitted from outside of the optical axis 1*a* toward the optical axis 1*a* at the processing point, the direction in which the decomposition product 30 is blown is different from the depth direction of the hole. The side flow nozzle provides a speed component perpendicular to the ejecting direction of the decomposition product 30, which is the same direction as the optical axis 1*a*, which can change the ejecting direction of the decomposition product 30 to a direction other than the axial direction of the optical axis 1*a*, efficiently prevent accumulation of the decomposition product 30 on the optical axis 1*a*, and prevent a decrease of the processing speed for processing the workpiece W due to the decomposition product 30 accumulating on the optical axis 1*a*.

In addition, because no obstruction to the flow of the gas 23 is present in the direction perpendicular to the optical axis 1*a*, the flow rate of the gas 23 is now lowered, and the direction in which the decomposition product 30 is ejected can be efficiently changed to a direction other than the axial direction of the optical axis 1*a*.

As a result, the laser processing apparatus 100 can prevent degradation in the mechanical strength properties of a workpiece W obtained by cutting and efficiently perform cutting of the workpiece W, and can perform laser cutting of the workpiece W with high quality and high efficiency in a short time.

In cutting of a workpiece W by the laser processing apparatus 100 according to the first embodiment, unlike typical laser cutting, the side flow nozzle described above is used in view of the fact that the direction in which the decomposition product 30 is ejected is coincident with the optical axis 1*a* and that a blind hole, which is a hole in the process of forming a through-hole is an obstruction to the flow of the gas 23.

The type of the gas 23 is not particularly limited because the purpose thereof is to remove the decomposition product 30, and gas such as nitrogen, helium, or oxygen can be used. An application pressure of the gas 23 is preferably 0.1 MPa or higher. When the application pressure of the gas 23 is equal to or lower than 0.1 MPa, the effect of removing the decomposition product 30 may be insufficient, and the processing quality may be degraded.

In addition, when a focused beam of the pulsed laser light 1 has a circular profile, the processing hole diameter d of a processing hole processed by a single pulse of the pulsed laser light 1 in the cutting direction is equal to a kerf width C in laser cutting, that is, a width of a cut groove in laser cutting. Specifically, when the processing hole diameter d is replaced by the focus diameter d of the pulsed laser light, the focus diameter d is equal to the width of a laser cut groove in laser cutting, and the processing hole diameter d can be replaced by the kerf width C in formula (3) described above. Thus, when the pulsed laser light 1 is a circular beam, the kerf width C can be regarded as a focused beam diameter of the pulsed laser light 1. In this case, the width of the cut groove in laser cutting can be controlled with high accuracy by control of the focus diameter d.

Next, a specific example of cutting using the laser processing apparatus 100 will be explained. Pulse energy necessary for penetration by a single pulse was examined using a CFRP with a PAN-based carbon fiber content of 70% and a thickness of 1 mm as a workpiece, and it was found out that at least a pulse energy as large as 0.15 J was necessary.

$CO_2$ laser light was used for the pulsed laser light 1. The focus diameter of the pulsed laser light 1, that is, the processing hole diameter d of a processing hole processed by a single pulse of the pulsed laser light 1 is 200 µm. It was confirmed by the experiments conducted by the inventors that the cutting quality lowers when the pulse width of the pulsed laser light 1 exceeds 1 ms. Thus, the pulse width of the pulsed laser light 1 is preferably smaller than 1 ms.

Figures 17, 18:
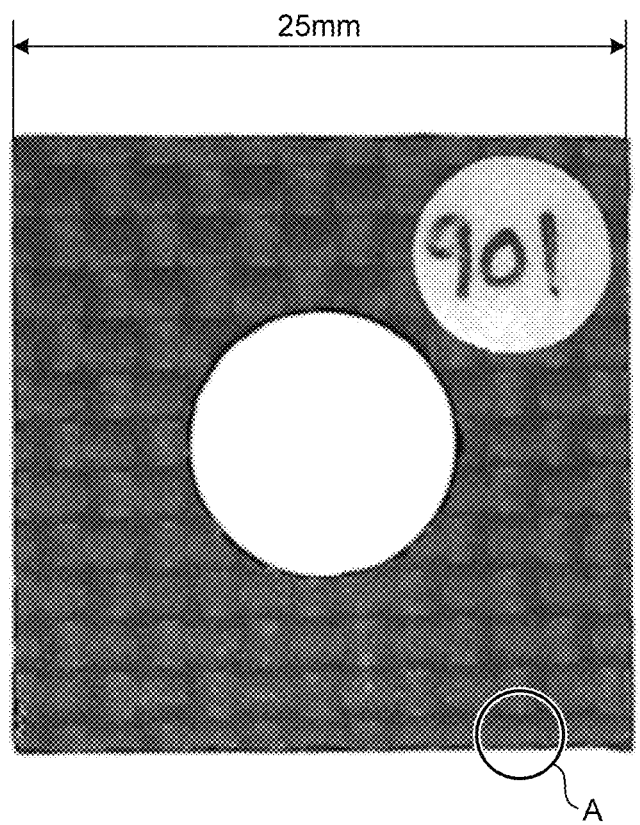
FIG. 17 is a table illustrating an example of cutting conditions with which a good processing quality of a workpiece was obtained by cutting using the laser processing apparatus.
FIG. 18 illustrates an image of a processing sample cut by the cutting using the laser processing apparatus.
Figure 19:
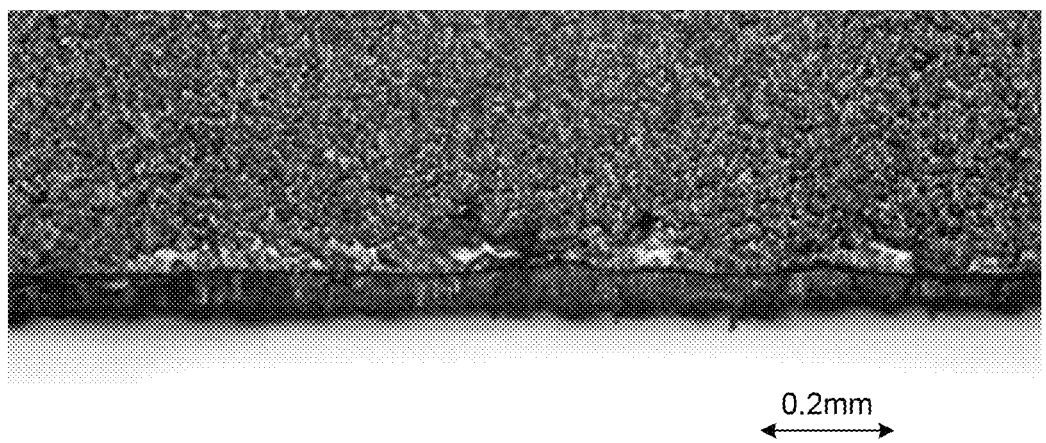
FIG. 19 illustrates an enlarged image of a region A of the processing sample illustrated in FIG. 18.

FIG. 17 is a table illustrating an example of cutting conditions with which a good processing quality of a workpiece was obtained by cutting using the laser processing apparatus 100. FIG. 18 illustrates an image of a processing sample cut by the cutting using the laser processing apparatus 100. FIG. 18 illustrates a sample cut by a single scanning of a workpiece having a thickness of 1 mm with the pulsed laser light 1 at a processing speed of 6 m/min. FIG. 19 illustrates an enlarged image of a region A of the processing sample illustrated in FIG. 18.

As illustrated in FIG. 17, cutting was performed on two processing samples, which are a processing sample having a thickness of 1 mm and a sample having a thickness of 2 mm. As a result, regarding the processing sample having a thickness of 1 mm, the overlap ratio ro was 23%, and the length h of the heat-affected zone was a small value of 0.1 mm. Regarding the processing sample having a thickness of 2 mm, the overlap ratio ro was 29%, and the length h of the heat-affected zone was a small value equal to or smaller than 0.15 mm. Note that, in FIG. 17, the overlap ratio ro is expressed in percentage. In addition, it was thus found out that even when cutting was performed under a low speed condition of a processing speed of 0.2 m/min, the length h of the heat-affected zone was a small value equal to or smaller than 0.15 mm as a result of setting the frequency of the pulsed laser light 1 to a low frequency, and good processing can be performed.

When cutting of a workpiece by using a three-dimensional robot is assumed, processing conditions of low speeds at acceleration and deceleration and at a corner portion of a cutting path are required. It is known that processing of the CFRP at low speeds significantly grows the thermal effects even when the laser output is decreased.

In contrast, the results of the experiments show that the laser processing method according to the first embodiment can achieve processing with high quality and small thermal effects on the resin of the CFRP by performing cutting of the CFRP by changing the pulse frequency depending on the processing speed.

The laser processing method according to the first embodiment is applicable to processing of various fiber reinforced composite materials such as a fiber reinforced composite material in which a plurality of reinforcing fibers are incorporated in a single layer along a single direction, a fiber reinforced composite material in which a plurality of reinforcing fibers are incorporated in a plurality of layers along different directions, and a fiber reinforced resin in which short reinforcing fibers are incorporated randomly in a single layer or a plurality of layers. In this case as well, the advantageous effects of the laser processing method according to the first embodiment can be produced.

In addition, while the reinforcing fibers are carbon in the first embodiment, the reinforcing fibers may be SiC, B, or the like, and the base material may be thermoplastic resin typified by polyamide resin and polycarbonate resin.

In addition, the laser processing method according to the first embodiment can be applied to processing such as cutting, drilling, and trimming of a reinforcing fiber composite material, which enables processing to be performed in a shorter time and more efficiently than machining and water-jet machining.

As described above, according to the laser processing apparatus and the laser processing method according to the first embodiment, a workpiece W can be penetrated in the thickness direction by a single pulse of the pulsed laser light 1, and thus generation of the heat-affected zone 53 caused by a state in which a bottom part of a hole in the process of formation of a through-hole remains at a high temperature can be prevented.

In addition, according to the laser processing apparatus and the laser processing method according to the first embodiment, processing is performed while the gas 23 is applied from outside of the optical axis 1a toward a processing point, which can remove the decomposition product 30 to outside of the optical axis 1a, and prevent a decrease in the processing speed of processing the workpiece W caused by the decomposition product 30 accumulating on the optical axis 1a.

In addition, according to the laser processing apparatus and the laser processing method according to the first embodiment, processing is performed with the pulsed laser light 1 having a small pulse width smaller than 1 ms, which enables cutting of a reinforcing fiber composite material with small thermal effects on the vicinity of a through-hole that is formed and with high quality.

Thus, the first embodiment produces advantageous effects of enabling laser processing of a fiber reinforced composite material while reducing thermal effects on the resin in the fiber reinforced composite material, and being capable of improving the processing speed and the processing quality of a fiber reinforced composite material in laser processing.

Second Embodiment

Figure 20:
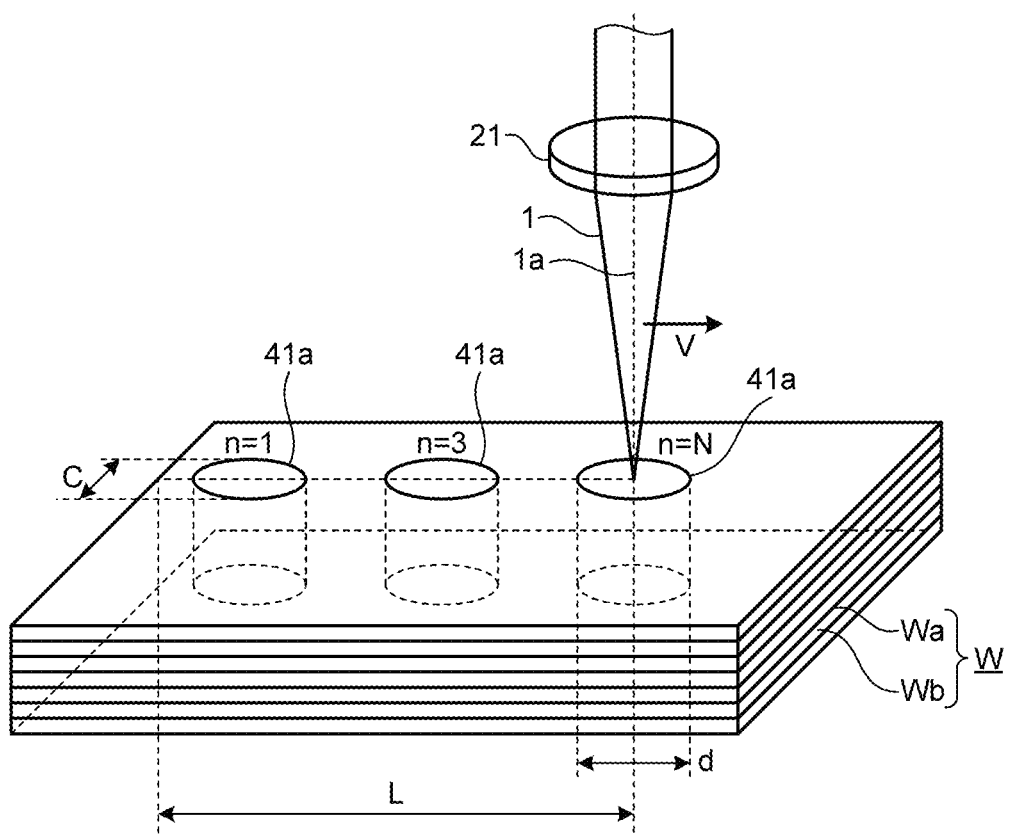
FIG. 20 is a diagram illustrating a laser processing method for cutting a cut length by performing scanning with the pulsed laser light twice in the laser processing apparatus illustrated in FIG. 1, in which a state of first scanning with the pulsed laser light is illustrated.
Figure 21:
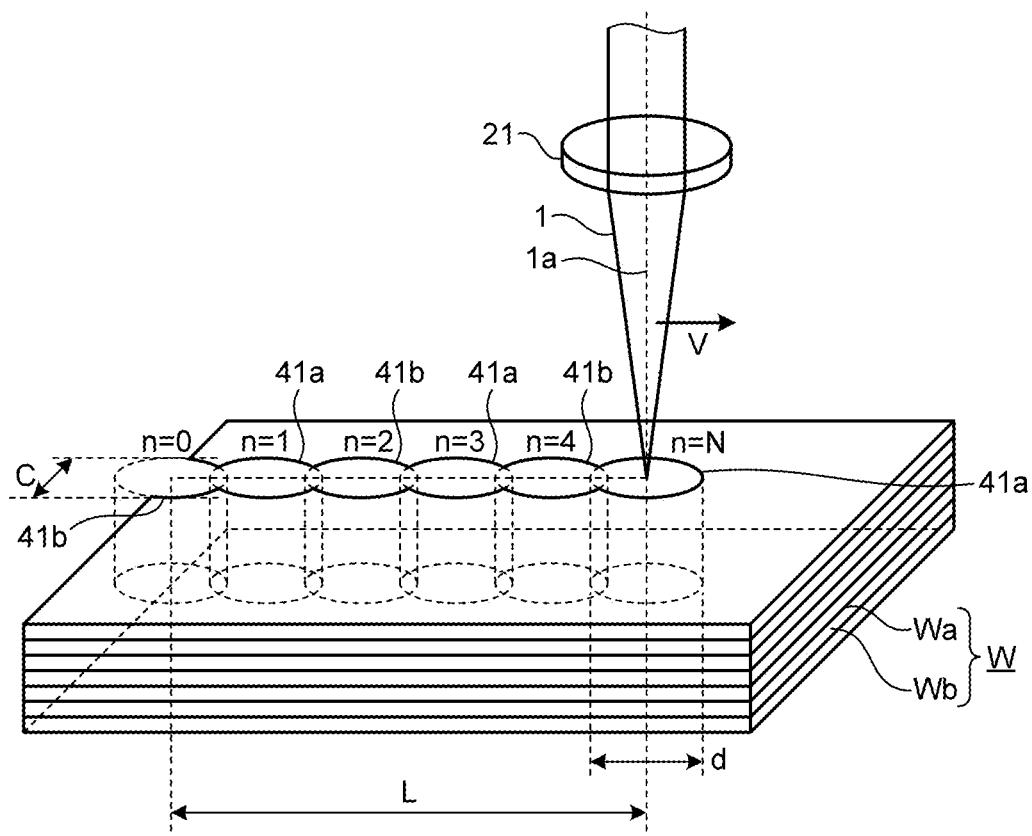
FIG. 21 is a diagram illustrating the laser processing method for cutting the cut length by performing scanning with the pulsed laser light twice in the laser processing apparatus illustrated in FIG. 1, in which a state of second scanning with the pulsed laser light is illustrated.

While an example in which the cut length L is cut by a single scanning with the pulsed laser light 1 is presented in the first embodiment described above, the cut length L may be cut by scanning with the pulsed laser light 1 twice. FIG. 20 is a diagram illustrating a laser processing method for cutting the cut length L by performing scanning with the pulsed laser light 1 twice in the laser processing apparatus 100 illustrated in FIG. 1, in which a state of first scanning with the pulsed laser light 1 is illustrated. FIG. 21 is a diagram illustrating the laser processing method for cutting the cut length L by performing scanning with the pulsed laser light 1 twice in the laser processing apparatus 100 illustrated in FIG. 1, in which a state of second scanning with the pulsed laser light 1 is illustrated.

As illustrated in FIG. 20, the first scanning with the pulsed laser light 1 processes processing holes 41a, which are odd-numbered processing holes 41. Subsequently, as illustrated in FIG. 21, the second scanning with the pulsed laser light 1 processes processing holes 41b, which are even-numbered processing holes 41, and cuts the cut length L.

In the second embodiment as well, the control unit 18 controls to change the relative positions of the processing head 13 and the workpiece W by controlling the driving unit 14 to meet the condition of formula (3) above. The control unit 18 also performs control to form the processing holes 41a by the first scanning with the pulsed laser light 1. The control unit 18 also performs control to form the processing holes 41b by the second scanning with the pulsed laser light 1.

The laser processing method according to the second embodiment described above can produce advantageous effects similar to those of the first embodiment described above, and thus produces advantageous effects of enabling laser processing of a fiber reinforced composite material while reducing thermal effects on the resin in the fiber reinforced composite material, and being capable of improving the processing speed and the processing quality of a fiber reinforced composite material in laser processing.

Figure 22:
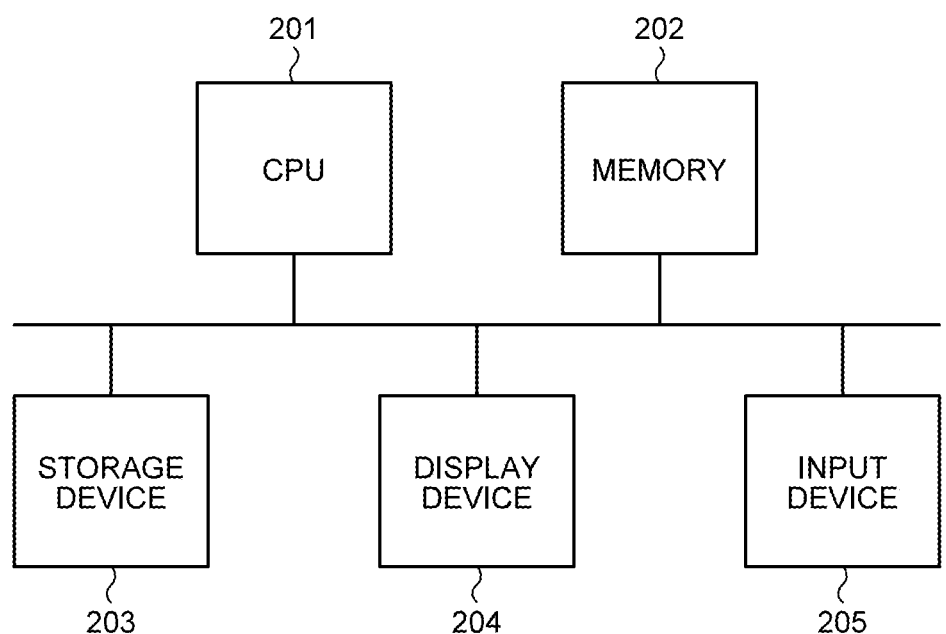
FIG. 22 is a diagram illustrating a hardware configuration for implementing the functions of a control unit illustrated in FIG. 1.

FIG. 22 is a diagram illustrating a hardware configuration for implementing the functions of the control unit 18 illustrated in FIG. 1. As illustrated in FIG. 22, the functions of the control unit 18 of the laser processing apparatus 100 are implemented by a control device including a central processing unit (CPU) 201, a memory 202, a storage device 203, a display device 204, and an input device 205. The functions performed by the control unit 18 are implemented by software, firmware, or a combination of software and firmware. The software or firmware is described in the form of computer programs and stored in the storage device 203. The CPU 201 implements the functions of the control unit 18 by reading the software or firmware stored in the storage device 203 into the memory 202 and executing the software or firmware. Thus, a computer system includes the storage device 203 for storing programs, which, when the functions of the control unit 18 are executed by the CPU 201, results in execution of steps of performing the operation of the control unit 18 described in the first embodiment. In other words, the programs cause a computer to execute the processes performed by the functions of the control unit 18. The memory 202 is a volatile storage area such as a random access memory (RAM). The storage device 203 is a non-volatile or volatile semiconductor memory such as a read only memory (ROM) or a flash memory, or a magnetic disk. Specific examples of the display device 204 include a monitor and a display. Specific examples of the input device 205 include a keyboard, a mouse, and a touch panel.

The configurations presented in the embodiments above are examples of the present invention, and technologies of the embodiments can be combined with each other or with other known technologies, or can be partly omitted or modified without departing from the scope of the present invention.

REFERENCE SIGNS LIST 1 pulsed laser light; 1a optical axis; 2 condenser lens; 11 laser oscillator; 12 optical path; 13 processing head; 14 driving unit; 15 nozzle; 16 nozzle moving mechanism; 17 detecting unit; 18 control unit; 21 condenser lens; 22 optical unit; 23 gas; 28 offcut; 29 processed product; 30 decomposition product; 41, 41a, 41b processing hole; 42 processing region; 51 hole; 52 bottom part; 53 heat-affected zone; 54 through-hole; 61 axial nozzle; 100 laser processing apparatus; 201 CPU; 202 memory; 203 storage device; 204 display device; 205 input device; C kerf width; d processing hole diameter; d1 hole diameter; f frequency; L cut length; N number of pulses; ro overlap ratio; Tp, Twc processing time; v scanning rate; W workpiece; Wa carbon fiber; Wb resin.

The invention claimed is:

1. A laser processing apparatus for laser processing of a workpiece, the laser processing apparatus comprising:
a processing head to irradiate the workpiece with a pulsed laser light to form a plurality of through-holes extending through the workpiece to divide the workpiece into a processed product and an offcut, the workpiece being made of a base material and a fiber reinforced composite material, the fiber reinforced composite material containing fibers having a thermal conductivity and a processing threshold higher than physical properties of glass fibers;

a driver to move at least one of the workpiece and the processing head in a predetermined cutting direction during the irradiation;

a controller to control irradiation of the workpiece with the pulsed laser light; and a nozzle to emit, during the pulsed laser light irradiation, a jet of gas from outside of an optical axis of the pulsed laser light toward the optical axis from the side of the processed product toward a processing point of the workpiece and the offcut, wherein the pulsed laser light has a pulse width smaller than 1 ms and an energy density capable of forming each of the through-holes by a single pulse, and each of the through-holes is formed by a single irradiation with the pulsed laser light.

2. The laser processing apparatus according to claim 1 further comprising:

a nozzle to emit a jet of gas from outside of an optical axis of the pulsed laser light toward the optical axis, wherein when a focus diameter of the pulsed laser light in the cutting direction is represented by a focus diameter d, a processing length is represented by a processing length L, and the number of pulses of the pulsed laser light emitted to a processing region having the processing length L is represented by the number N of pulses, the control unit irradiates the workpiece with the pulsed laser light from the processing head and emits a jet of gas from outside of an optical axis of the pulsed laser light toward the optical axis during the laser processing in such a manner that an overlap ratio ro being a ratio of a length by which two of the through-holes adjacent to each other in the cutting direction overlap each other in the cutting direction to the focus diameter d meets the following formula:

$0 < ro = (d - L/N)/d < 0.5$.

3. The laser processing apparatus according to claim 2, wherein the pulsed laser light is focused into a circular shape and emitted to the workpiece, and the focus diameter d is equal to a width of a laser cut groove cut by the pulsed laser light.

4. The laser processing apparatus according to claim 2, wherein the overlap ratio ro is 0.2.

5. The laser processing apparatus according to claim 1, further comprising:

a laser oscillator to emit the pulsed laser light, wherein the laser oscillator is a $CO_2$ laser.

6. The laser processing apparatus according to claim 1, wherein the pulsed laser light has a pulse energy being equal to or larger than 0.5 J.

7. The laser processing apparatus according to claim 1, wherein the pulsed laser light has a focus diameter d being equal to or less than 200 μm.

8. The laser processing apparatus according to claim 1, wherein the workpiece is processed by changing a pulse frequency of the pulsed laser light depending on a processing speed of the workpiece in such a manner that a range of the pulse frequency depends on a range of the processing speed, the range of the pulse frequency being equal to or larger than 21 Hz and equal to or less than 700 Hz while the range of the processing speed being equal to or larger than 0.2 m/min and equal to or less than 6 m/min.

9. A laser processing apparatus for laser processing of a workpiece, the laser processing apparatus comprising:

a processing head to irradiate the workpiece with a pulsed laser light to form a plurality of through-holes extending through the workpiece, the workpiece being made of a base material and a fiber reinforced composite material, the fiber reinforced composite material containing fibers having a thermal conductivity and a processing threshold higher than physical properties of glass fibers;

a driver to move at least one of the workpiece and the processing head in a predetermined cutting direction during the irradiation;

a controller to control irradiation of the workpiece with the pulsed laser light; and a nozzle to emit, during the pulsed laser light irradiation, a jet of gas from outside of an optical axis of the pulsed laser light toward the optical axis, wherein the pulsed laser light has a pulse width smaller than 1 ms and an energy density capable of forming each of the through-holes by a single pulse, each of the through-holes is formed by a single irradiation with the pulsed laser light, and the workpiece is processed by changing a pulse frequency of the pulsed laser light depending on a processing speed of the workpiece in such a manner that a range of the pulse frequency depends on a range of the processing speed, the range of the pulse frequency being equal to or larger than 21 Hz and equal to or less than 700 Hz while the range of the processing speed being equal to or larger than 0.2 m/min and equal to or less than 6 m/min.

* * * * *